(12) United States Patent
Herath et al.

(10) Patent No.: US 11,422,742 B2
(45) Date of Patent: Aug. 23, 2022

(54) ALLOCATION OF MEMORY

(71) Applicant: Imagination Technologies Limited, Kings Langley (GB)

(72) Inventors: Isuru Herath, Hertfordshire (GB); Richard Broadhurst, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 73 days.

(21) Appl. No.: 16/791,433

(22) Filed: Feb. 14, 2020

(65) Prior Publication Data

US 2020/0264808 A1 Aug. 20, 2020

(30) Foreign Application Priority Data

Feb. 14, 2019 (GB) .................................... 1902078
Jan. 16, 2020 (GB) .................................... 2000652

(51) Int. Cl.
*G06F 3/06* (2006.01)
*G06F 9/30* (2018.01)
*G06F 9/32* (2018.01)
*G06F 9/50* (2006.01)

(52) U.S. Cl.
CPC .......... *G06F 3/0659* (2013.01); *G06F 3/0604* (2013.01); *G06F 3/0673* (2013.01); *G06F 9/30101* (2013.01); *G06F 9/324* (2013.01); *G06F 9/5016* (2013.01)

(58) Field of Classification Search
CPC .... G06F 3/0659; G06F 3/0604; G06F 3/0673; G06F 9/30101; G06F 9/321; G06F 9/324; G06F 9/485; G06F 9/4881; G06F 9/5016; G06F 9/3851; G06F 9/30123; G06F 2209/507; G06F 2212/1024; G06F 12/0223; G06F 12/0284; G06F 9/345; G06F 9/3885

See application file for complete search history.

(56) References Cited

U.S. PATENT DOCUMENTS

| | | | |
|---|---|---|---|
| 6,453,370 B1 | 9/2002 | Stracovsky et al. | |
| 7,634,621 B1 | 12/2009 | Coon et al. | |
| 8,832,671 B1 | 9/2014 | Patney et al. | |
| 2005/0289322 A1 | 12/2005 | Peri et al. | |
| 2006/0002224 A1 | 1/2006 | Zhang et al. | |

(Continued)

FOREIGN PATENT DOCUMENTS

| | | |
|---|---|---|
| WO | 2009145917 A1 | 12/2009 |
| WO | 2019027544 A1 | 2/2019 |

OTHER PUBLICATIONS

ATOOFIAN; "Temperature-Aware Register Mapping in GPGPUs" 2016 IEEE TrustCom-BigDataSE-ISPA; Aug. 23, 2016; pp. 1636-1643.

*Primary Examiner* — Yaima Rigol
(74) *Attorney, Agent, or Firm* — Potomac Law Group, PLLC; Vincent M DeLuca

(57) ABSTRACT

Methods of memory allocation map registers referenced by different groups of instances of the same task to individual logical memories. Other example methods describe the mapping of registers referenced by a task to different banks within a single logical memory and in various examples this mapping may take into consideration which bank is likely to be the dominant bank for the particular task and the allocation for one or more other tasks.

20 Claims, 6 Drawing Sheets

(56) References Cited

U.S. PATENT DOCUMENTS

| | | | |
|---|---|---|---|
| 2007/0245087 A1* | 10/2007 | Sakata | G06F 15/8084 |
| | | | 711/119 |
| 2014/0032873 A1 | 1/2014 | Ozdemir et al. | |
| 2015/0169370 A1 | 6/2015 | Howson et al. | |
| 2015/0293793 A1* | 10/2015 | Vrind | G06F 9/4887 |
| | | | 718/103 |
| 2019/0043558 A1* | 2/2019 | Suh | G11C 11/40618 |
| 2019/0087188 A1 | 3/2019 | Vaidyanathan et al. | |
| 2019/0114205 A1 | 4/2019 | Kloosterman et al. | |
| 2019/0187964 A1 | 6/2019 | Wyse et al. | |
| 2019/0265974 A1 | 8/2019 | Cheng et al. | |
| 2020/0004534 A1 | 1/2020 | Gurram et al. | |
| 2020/0264808 A1 | 8/2020 | Herath et al. | |

* cited by examiner

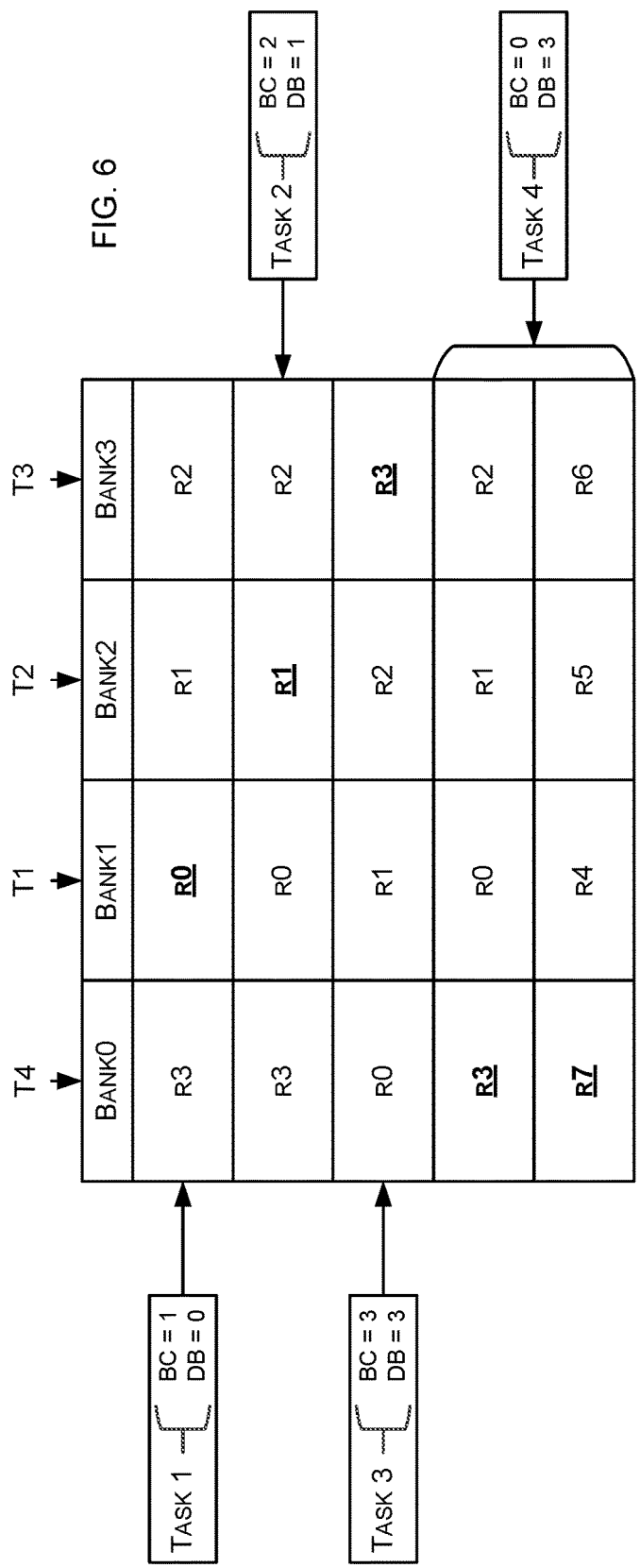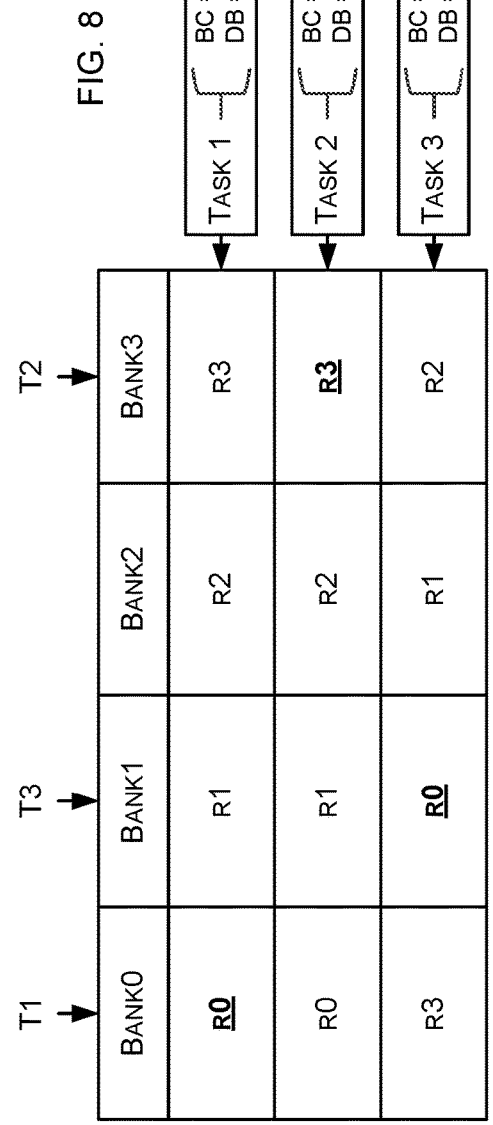

ALLOCATION OF MEMORY

BACKGROUND

In a processing system, when a task is created, a portion of memory is allocated to that task. An address generation unit then maps registers referenced within the task to actual memory addresses within the allocated portion of memory. Two tasks may be allocated memory addresses within the same memory. Clashes may occur when multiple access requests are made to the memory at the same time. For example, two tasks may each request a value from the memory, or, a single task may request two values from the memory. This has the effect that one access must be stalled until the other access has been completed.

In order to increase read/write throughput (by reducing the occurrence of stalls), the memory may be arranged into a plurality of separate banks and in any cycle, data can be read from each of the banks. In this way, the processing system can simultaneously access different banks within the same memory (e.g. read a register value from line 0 in bank 0 of the memory and read a register value from line 2 in bank 1 of the memory), but whenever an attempt is made to access the same bank at the same time, a clash occurs and one of the accesses has to stall. This affects the performance of the processing system.

The embodiments described below are provided by way of example only and are not limiting of implementations which solve any or all of the disadvantages of known methods of memory allocation.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods of memory allocation are described. A first example method maps registers referenced (e.g. used) by groups of instances of the same task to individual logical memories. Other example methods described herein include the mapping of registers referenced (e.g. used) by a task to different banks within a single logical memory and in various examples this mapping may take into consideration which bank is likely to be the dominant bank for the particular task and the allocation for one or more other tasks.

A first aspect provides a method of memory allocation in a processing system, the processing system comprising a memory comprising b memory banks, wherein b is an integer, and the method comprising: allocating a bank counter value to a task; and mapping registers referenced by the task to memory banks in the memory, wherein the mapping is based on b and the allocated bank counter value.

A second aspect provides a processing system comprising: a memory comprising b memory banks, wherein b is an integer; a bank counter; a task creation module configured to allocate a bank counter value to a task; and an address generation unit configured to map registers referenced by the task to memory banks in the memory, wherein the mapping is based on b and the allocated bank counter value.

A third aspect provides a processing system configured to perform any of the methods described above.

The processing system described herein may be embodied in hardware on an integrated circuit. There may be provided a method of manufacturing, at an integrated circuit manufacturing system, a processing system as described herein. There may be provided an integrated circuit definition dataset that, when processed in an integrated circuit manufacturing system, configures the system to manufacture a processing system as described herein. There may be provided a non-transitory computer readable storage medium having stored thereon a computer readable description of an integrated circuit that, when processed, causes a layout processing system to generate a circuit layout description used in an integrated circuit manufacturing system to manufacture a processing system as described herein.

There may be provided an integrated circuit manufacturing system comprising: a non-transitory computer readable storage medium having stored thereon a computer readable integrated circuit description that describes the processing system as described herein; a layout processing system configured to process the integrated circuit description so as to generate a circuit layout description of an integrated circuit embodying the processing system as described herein; and an integrated circuit generation system configured to manufacture the processing system as described herein according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 6 is a schematic diagram that illustrates the method of FIG. 5;

FIG. 8 is a schematic diagram that illustrates the method of FIG. 7;

Figure 1:
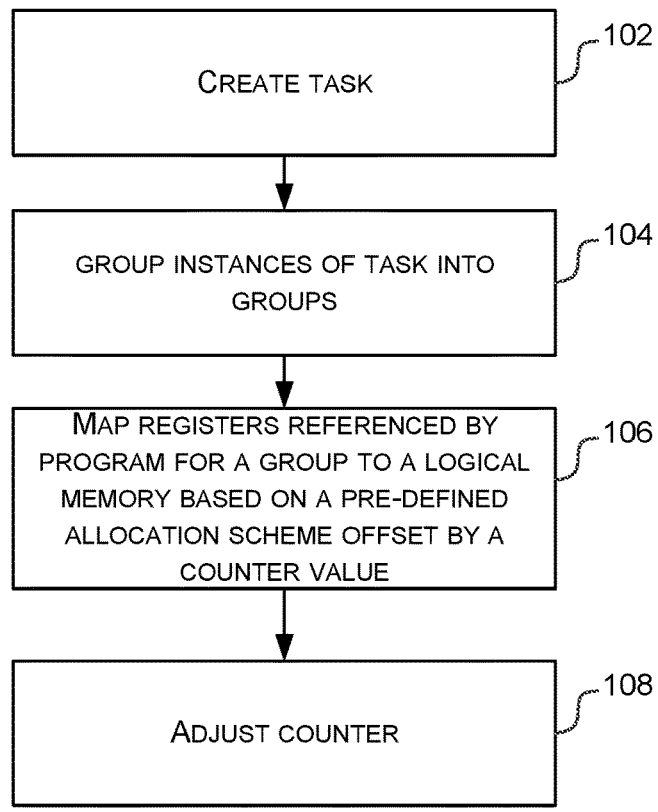
FIG. 1 is a flow diagram of a first example method of memory allocation.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

As described above, a processing system (e.g. a system comprising a CPU or GPU and memory) may comprise multiple banks within a memory. The instructions that are executed (e.g. read or write instructions) do not, typically, refer to any specific bank but just refer to a register number, e.g. read r0, where r0 refers to register 0. In known processing systems, an address generation unit maps the register number to a bank within the memory based on a defined formula (or relationship), such as:

(bank number)=(register number)mod(number of banks)      (equation 1)

and address decode logic within each bank maps the register number to an actual memory location (or memory address) within the specified bank (as given by the formula above) based on the register number (which may be treated as an offset, where for example, offset=(register number) divided by (number of banks)) and a base pointer.

As described above, if multiple attempts are made to access the same bank of memory at the same time (e.g. because by using the formula above, the same bank is indicated), a clash occurs and all but one of the multiple access attempts is stalled. As well as providing multiple banks within a single memory to reduce the number of clashes, multiple memories may be provided, each memory having multiple banks, or, the banks within a memory may be divided into two or more logically independent memories (e.g. eight logical memories) by providing a corresponding number of ports, each port providing access to a separate, non-overlapping subset of the banks (e.g. one port for banks 0-3 and the other for banks 4-7). This increases the number of simultaneous accesses that can occur without a clash.

For the purposes of the following description, a logical memory refers to an area of memory with a dedicated access port whereas a bank within a logical memory shares the access port with the other banks in that logical memory. As described above, in any cycle, data can be read from each of the banks in a logical memory via the access port and the access port has sufficient width to support this.

Various methods and apparatus for memory allocation are described herein. A first method relates to the mapping of registers to memories, where as described above a memory may be a separate physical or logical memory with a dedicated port. By mapping (or allocating) registers to memories such that accesses (e.g. reads from or writes to the memory) are more evenly spread (or such that the probability is that accesses are more evenly spread) between those memories, the probability of clashes occurring is reduced and hence the performance impact of clashes is also reduced. Additional methods described herein relate to the mapping of registers to banks within a memory (or within a plurality of physically or logically separate memories). These methods of mapping (or allocating) registers to banks may be used in combination with the method of mapping (or allocating) registers to memories or may be used independently of that first method described herein. By mapping (or allocating) registers to banks such that accesses are more evenly spread (or such that the probability is that accesses are more evenly spread) between banks within a memory, the probability of clashes occurring is reduced and hence the performance impact of clashes is also reduced. A system may be designed to balance performance (using multiple banks and/or memories and the methods described herein) against any costs of providing additional banks and/or memories (e.g. in terms of size of hardware).

The term 'task' is used herein to refer to a group of data-items and the work that is to be performed upon those data-items. For example, in a Single Instruction Multiple Data (SIMD) processing system a task may comprise or be associated with a program or reference to a program (e.g. the same sequence of ALU instructions or reference thereto) in addition to a set of data that is to be processed according to the program, where this set of data may comprise one or more data elements (or data-items, e.g. a plurality of pixels or vertices).

The term 'program instance' is used herein to refer to individual instances that take a path through the code. A program instance therefore refers to a single data-item and a reference (e.g. pointer) to a program which will be executed on the data-item. A task therefore could be considered to comprise a plurality of program instances (e.g. up to 32 program instances), though in practice only a single instance of the common program (or reference) is required per task. There is therefore a hierarchy of terminology, with tasks comprising a plurality of program instances.

A program typically performs operations on values stored in registers and each program instance requires its own copy of each register value. There may be many registers used (or referenced) by each program and many tasks running concurrently on a processing system and hence the methods described herein may be used to provide a way of flexibly allocating a relatively large number of registers.

A first method of memory allocation can be described with reference to FIG. 1. This method relates to the mapping (or allocation) of registers to memories, rather than individual banks within a memory, where, as described above, a memory may be a separate physical or logical memory with a dedicated port.

When a task is created (block 102), the task may comprise multiple instances, e.g. the same instruction may be applied to multiple separate data items and each combination of the instruction and a different data item comprises a separate instance. For example, a single instruction may be executed on 16, 32 or 64 data points (e.g. 16, 32 or 64 pixels, samples, primitives, vertices, etc.) and hence there are 16, 32 or 64 instances of the task. These instances of a task are then packed (or grouped) into groups, which may be referred to as quads in examples where each group can accommodate four instances (block 104). The use of quads may be particularly suited to pixel processing activities as the processing operates on 2×2 fragments; however in other examples, there may be a different number of instances per group and in various examples the number of registers in a line in a bank of memory may correspond to the number of instances in each group. In various examples there may be 8 groups (or quads) per task; however the number of groups (and hence instances) may be much larger, e.g. 32 groups per task and/or 128 instances per task. Depending upon the number of instances of a particular task, the final group may be filled completely or may be only partially filled and if different tasks comprise different numbers of instances, different tasks may fill a different number of groups. Additionally, some of the other groups may also be partially filled, e.g. where certain criteria exist that control the way instances are packed into groups.

Having packed all the instances of a task into groups (in block 104), the registers referenced (e.g. used or required) by each program instance in a group are mapped to a logical memory (block 106) e.g. the registers referenced by the program for each instance in the group are mapped to a separate memory or to a separate group of banks within a memory that has a dedicated port. In various examples, registers referenced by each group of instances of the same task are mapped (in block 106) to a different logical memory; however in many examples there are many more groups of instances from the same task than logical memories, such that registers from multiple groups of instances of the same task are mapped to the same logical memory. In various examples, there may be restrictions based on the execution pipelines used, such that instances of a task that are processed by a particular execution pipeline can only have their registers mapped to a pre-defined subset of the logical memories and there may be different pre-defined subsets for different execution pipelines. The mapping of registers for groups to logical memories (in block 106) is based on a pre-defined allocation scheme and a value of a counter, which may be referred to as the group counter.

The pre-defined allocation scheme (as used in block 106) may map (or allocate) registers referenced by groups to memories using a pre-defined sequence of memories (e.g. memory0, memory1, memory2, . . . ) and the allocation may start at a position in the sequence that is determined based on the counter value. In this scheme, if the counter value is zero, the registers referenced by groups are mapped to memories starting at the beginning of the pre-defined sequence (e.g. registers for group0 are mapped to memory0, registers for group1 are mapped to memory1, etc.) and if the counter value is non-zero, the registers for groups are mapped to memories starting at an offset position in the pre-defined sequence where the offset is equal to (or otherwise derived from) the counter value. For example, if the counter value is one, the mapping starts at the second memory in the pre-defined sequence (e.g. registers for group0 are mapped to memory1, registers for group1 are mapped to memory2, etc.). Where the counter value is non-zero, the pre-defined sequence of memories may be considered to wrap around, such that if there are n memories denoted memory0 to memory(n−1), after mapping registers for a group to memory(n−1), the registers for the next group are mapped to memory0.

As shown in FIG. 1, for each task that is created (in block 102), the counter is adjusted (block 108) and this adjusting operation (in block 108) may occur after the mapping of registers to memories (in block 106), as shown in FIG. 1, or at any other stage in the method of FIG. 1 (e.g. after block 102 or after block 104). The adjustment (in block 108) takes the counter value for the previous task and updates the counter value, for example by incrementing its value. In one example, the counter is incremented (in block 108) by one for each task that is created (in block 102) and in another example the counter is incremented (in block 108) by the number of groups, G, that are formed for the particular task (in block 104), where G is an integer and G≥1. Using this latter technique, if the memories are labelled numerically, if the registers for the last group in a task are mapped to memory A (where A is an integer), then the registers for the first group formed from instances of the next task may be mapped to memory (A+1). In other examples, the counter may be adjusted (e.g. incremented) by other amounts (in block 108), e.g. by a random amount between 0 and n, where n is the number of logical memories. In various examples, the value of the counter may be capped based on the number of memories, e.g. capped at n−1, where n is the number of memories, and then may wrap back to a value of 0.

By changing the way that registers used (i.e. referenced) by groups are mapped to memories so that the mapping is not the same for all tasks (even though the underlying pre-defined allocation scheme remains the same, to reduce complexity), the distribution of memory accesses is more evenly spread across the different logical memories and this reduces the probability of clashes and hence the performance impact of clashes is also reduced. In particular, if this method is not used, the registers for the first group of each task will always be mapped to the first memory and given that all tasks will comprise at least one group of instances (and this group is likely to be always fully populated with instances), this memory to which registers for the first group are mapped is likely to get the highest number of accesses of all the memories and hence is more susceptible to clashes. By offsetting, as described above based on the counter value, the pressure on the memories will be more evenly spread, resulting in memories being accessed more uniformly, fewer clashes and hence fewer stalls.

Figure 2:
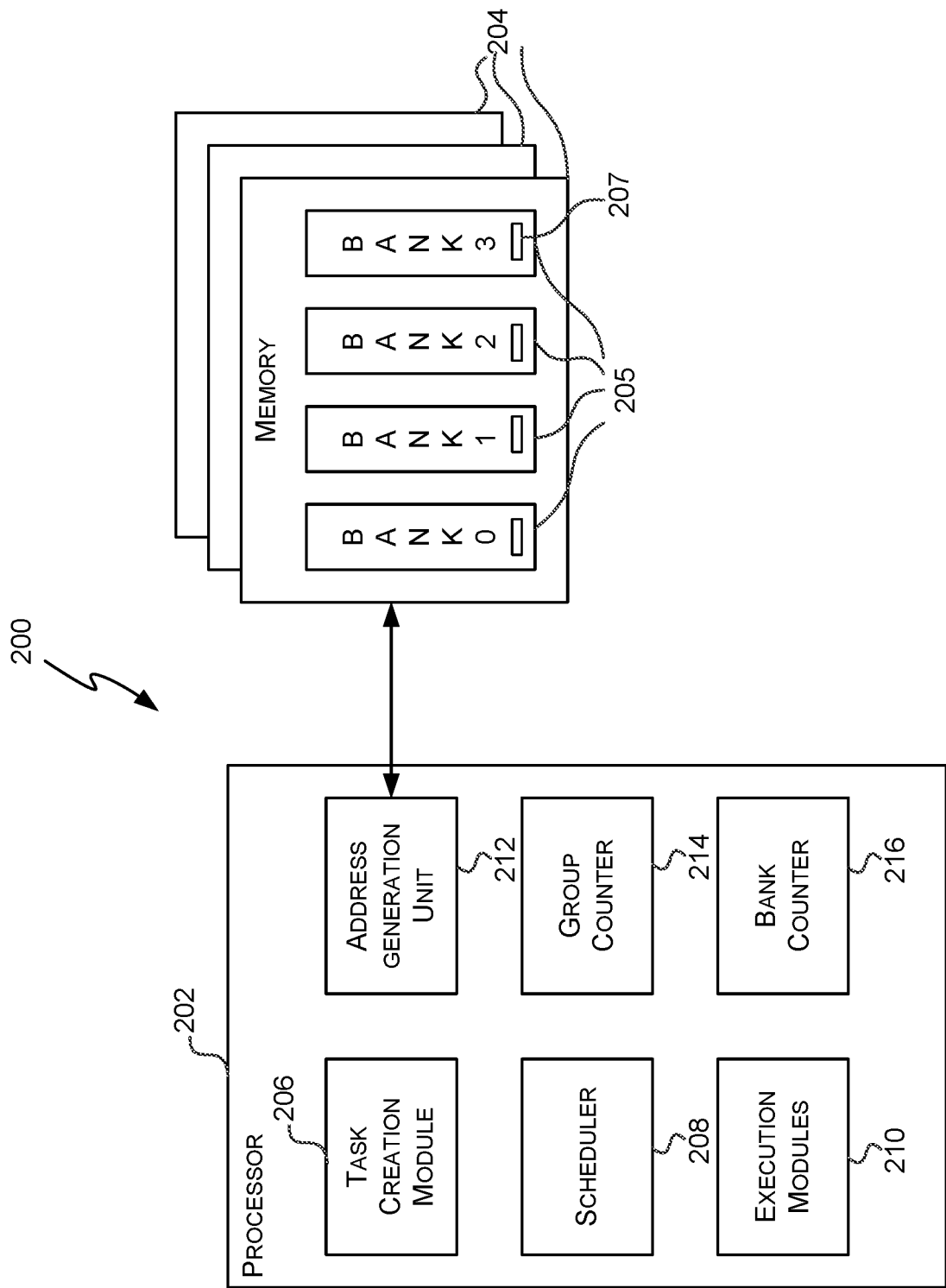
FIG. 2 is a schematic diagram of a processing system.

The different operations within FIG. 1 may be performed by different parts of a processing system and an example processing system 200 is shown in FIG. 2. The processing system 200 comprises a processor 202 (e.g. a CPU or GPU) and a plurality of logical memories 204. In various examples, the number of logical memories 204 in the processing system 200 may be equal to the maximum number of groups per task, to enable a one-to-one relationship between groups (and hence registers for those groups) and memories within each task. The task is created (in block 102) by a task creation module 206 and the instances are created and then packed (or grouped) into groups (in block 104) by a scheduler 208. The instances are then executed by the execution modules (or pipelines) 210. The updating of the group counter 214 (in block 108) may be performed by the task creation module 206 or the scheduler 208 and the mapping of registers referenced by groups to logical memories (in block 106) based on a pre-defined allocation scheme and the value of the group counter 214 may be implemented by an address generation unit 212.

Figure 3:
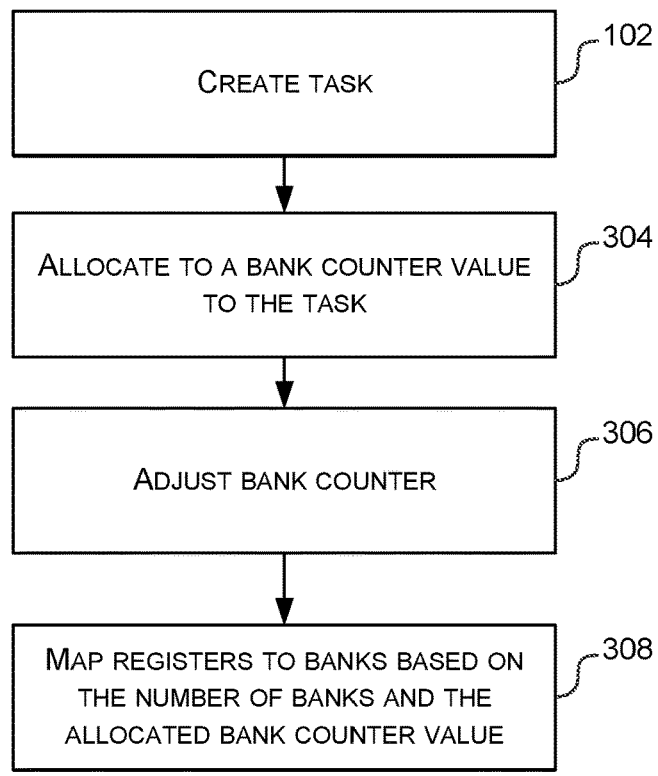
FIG. 3 is a flow diagram of a second example method of memory allocation.

A second method of memory allocation can be described with reference to FIG. 3. This method relates to the mapping (or allocation) of registers to banks within a single logical memory, rather than allocation of different logical memories, and this second method (as shown in FIG. 3) may be used in combination with, or independently of, the first method described above (as shown in FIG. 1). As noted above, separate logical memories have separate access ports, whereas banks within a logical memory share the same access port.

When a task is created (block 102), a bank counter value is allocated to the task (block 304) and this bank counter value that is allocated may be the current value of a counter which may be referred to as the 'bank counter' and which is different to the counter referred to in FIG. 1 (which is the group counter 214 in FIG. 2). The allocated bank counter value (from block 304) is then used to map registers referenced by the task to banks within a single logical memory. The mapping is based on the number of banks in the logical memory and the allocated bank counter value (block 308). In various examples, the mapping (in block 308) may use a formula that is a modified version of equation (1) above and is given by:

(bank number)=((register number)+(allocated bank counter value))mod(number of banks) (equation 2)

In this equation, the register number and allocated bank counter value are summed prior to the modulus operation and the result is the bank number to which the register is mapped; however, the same result may be achieved in different ways. In other examples, the allocated bank counter value may be used by the address generation unit to determine an additional offset (the bank offset) that is applied when determining the actual memory address for a register based on a base pointer for the task and the register number (specified as a register offset):

$$\text{(memory address)} = \text{(base pointer for task)} + \text{(register offset)} + \text{(bank offset)} \quad \text{(equation 3)}$$

The base pointer for a task is determined at task creation based on the memory requirements of the previously created task. In further examples, the allocated bank counter value may be used by the task creation module to update the base pointer for the task and that updated base pointer is then used by the address generation unit when determining the actual memory address for a register based on a base pointer for the task and the register number:

$$\text{(memory address)} = \text{(updated base pointer for task)} + \text{(register offset)} \quad \text{(equation 4)}$$

Irrespective of which of equations (2)-(4) are used; the same mapping of registers to banks is achieved.

The mapping scheme (as used in block 308) maps registers to banks in such a way that register0 for different tasks will not always be in the same bank (bank0) as would be the case if equation (1) was used. This has the effect of spreading the distribution of memory accesses more uniformly between banks, which reduces the probability of clashes and hence the performance impact of clashes (i.e. the performance impact of stalls) is also reduced.

As shown in FIG. 3, for each task that is created (in block 102), the bank counter (from the previous task) is adjusted (block 306) and this may occur after the allocation of a bank counter value to the newly created task (in block 304), as shown in FIG. 3, or at any other stage in the method of FIG. 3. In one example, the bank counter is incremented (in block 306) by one for each task that is created (in block 102) and in another example the counter is incremented (in block 306) by other amounts, e.g. by a fixed or variable amount between 0 and b−1, where b is the number of banks. In various examples, the value of the bank counter may be capped based on the number of banks, e.g. capped at b−1, where b is the number of banks, and then may wrap back to a value of 0; although as a modulus operation is performed (in equation 2), the bank counter value is effectively capped at b−1.

Figure 4:
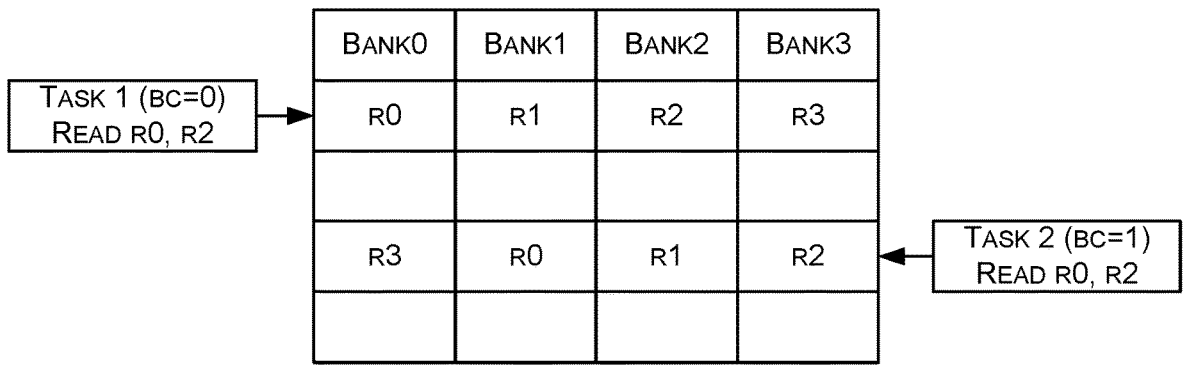
FIG. 4 is a schematic diagram that illustrates the method of FIG. 3.

FIG. 4 is a schematic diagram showing an example of the mapping between registers and banks for two different tasks (task1 and task2) in an example where the bank counter is incremented by one for each task. In this example, through the use of any of equations (2)-(4), register0 (r0) for the two tasks is allocated to different banks-bank0 for task1 and bank1 for task2.

By changing the way that registers are mapped to banks so that the mapping is not the same for all tasks, the distribution of memory accesses tends to be more evenly spread across the different banks within a logical memory and this reduces the probability of clashes and hence the performance impact of clashes is also reduced. In particular, if this method is not used, the first register (register0) for each task will always be mapped to the first bank and this may result in the first bank getting the highest number of accesses of all the banks and hence be more susceptible to clashes. By offsetting, as described above based on the bank counter value, the pressure on the banks will be more evenly spread, resulting in banks being accessed more uniformly, fewer clashes and less stalls.

As noted above, the different operations within FIG. 3 may be performed by different parts of the processing system 200 shown in FIG. 2. As described above, the task is created (in block 102) by a task creation module 206 and the task creation module 206 additionally allocates the bank counter value to the task (in block 304) and updates the bank counter 216 (in block 306). The mapping of registers to banks 205 is performed by the address generation unit 212 (in block 308); however, as described above the address generation unit 212 may use the allocated bank counter value itself as part of the mapping (with the bank counter value being communicated by the task creation module 206 to the address generation unit 212) or the address generation unit 212 may receive an updated base pointer for the task from the task creation module 206, where the updated base pointer has been calculated based on the allocated bank counter value. As shown in FIG. 2, each bank 205 may comprise address decode logic 207 that is arranged to identify a line within a bank that a particular register is mapped to, based on the address of the register as determined by the address generation unit 212. Since each bank 205 has its own address decode logic 207, data can be read from a different line of each bank at the same time.

A third method of memory allocation can be described with reference to FIG. 5. This method, like the second method, relates to the mapping (or allocation) of registers to banks within a single logical memory, rather than mapping registers to different memories, and this may be used in combination with, or independently of, the first method described above (as shown in FIG. 1). Unlike the second method, the third method involves the determination of a 'dominant bank' for a particular task, where different tasks may, as a consequence of the programs they refer to, have different dominant banks, but tasks that use the same program will have the same dominant bank. The term 'dominant bank' is used herein to refer to the bank that is statistically most likely to receive the highest number of accesses when the task is executed. It is not, however, guaranteed to identify the bank with the highest number of accesses, because the determination of a dominant bank may, in various examples, not take into consideration one or more run-time factors, such as the number of times a loop is executed, although depending upon the complexity some run-time factors (e.g. the execution of some loops) may be included when determining the dominant bank of a task. The determination of the dominant bank for any program (and hence any task that uses the program) may be made at compile time by a compiler (e.g. when compiling the program), e.g. using equation (1) above, and the dominant bank information may be communicated to the processing system (e.g. in the form of meta data associated with the program). The dominant bank for any program is therefore fixed and is defined with respect to the program (and irrespective of any offset that may be applied using the mapping scheme described below).

Figure 5:
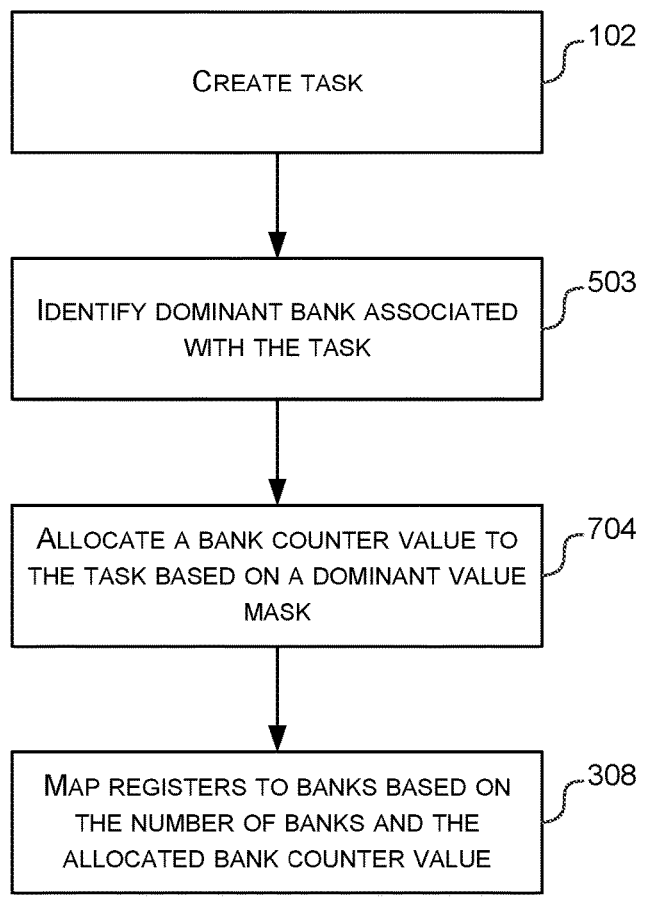
FIG. 5 is a flow diagram of a third example method of memory allocation.

As shown in FIG. 5, when creating a task (block 102) or at a separate time, meta data for the task (e.g. meta data for the program used by the task) is received and this meta data is used to identify the dominant bank associated with the task (block 503). As in the second method, a bank counter value is allocated to the task (block 304) and this bank counter value that is allocated may be the current value of the bank counter 216 (which, as noted above, is different to the group counter 214 referred to in FIG. 1). The allocated bank counter value (from block 304) is then used to map registers used by a task to banks based on the number of banks in the logical memory, the allocated bank counter value and the dominant bank (block 508). In various examples, the mapping (in block 508) may use a formula that is a modified version of equation (2) above and is given by:

(bank number)=((register number)+(bank difference)) mod(number of banks)      (equation 5)

where (bank difference)=(allocated bank counter value)− (dominant bank)      (equation 6)

In other examples, the bank difference may be used by the address generation unit to determine an additional offset (the bank difference offset) that is applied when determining the actual memory address for a register based on a base pointer for the task and the register number (specified as a register offset):

(memory address)=(base pointer for task)+(register offset)+(bank difference offset)      (equation 7)

or the bank difference may be used by the task creation module to update the base pointer for the task and that updated base pointer is then used by the address generation unit when determining the actual memory address for a register based on a base pointer for the task and the register number:

(memory address)=(updated base pointer for task)+ (register offset)      (equation 8)

The mapping scheme (as used in block 508) maps registers to banks in such a way that whilst the dominant banks for different tasks may clash, the banks that are expected to be most frequently accessed, after all offsets have been applied, do not clash. This has the effect of spreading the distribution of memory accesses more uniformly between banks, which reduces the probability of clashes and hence the performance impact of clashes (i.e. the performance impact of stalls) is also reduced.

As shown in FIG. 5, for each task that is created (in block 102), the bank counter is incremented (block 306) and this may occur after the allocation of a bank counter value to the newly created task (in block 304), as shown in FIG. 5, or at any other stage in the method of FIG. 5. In one example, the bank counter is incremented (in block 306) by one for each task that is created (in block 102) and in another example the counter is incremented (in block 306) by other amounts, e.g. by a fixed or variable amount between 0 and b−1, where b is the number of banks. In various examples, the value of the bank counter may be capped based on the number of banks, e.g. capped at b−1, where b is the number of banks, and then may wrap back to a value of 0; although as a modulus operation is performed (in equation 5), the bank counter value is effectively capped at b−1.

FIG. 6 is a schematic diagram showing an example of the mapping between registers and banks for different tasks (tasks 1-4) in an example where the bank counter is incremented by one. In this example, through the use of any of equations (5)-(8), the dominant banks are allocated in a round robin manner (i.e. the dominant bank advances by one position for each task, as indicated by the vertical arrows above banks 0-3). For task1 (T1), the allocated bank counter value (BC) is one and the dominant bank (DB) is zero and hence r0 is rotated by the bank difference (i.e. using equations (5) and (6) it is rotated by one to bank1) which means that the bank that expected to be most frequently accessed, after all offsets have been applied is bank1. For task2 (T2), the allocated bank counter value (BC) is two and the dominant bank (DB) is one and hence r0 is rotated by the bank difference (i.e. by one to bank1) which means that the bank that expected to be most frequently accessed, after all offsets have been applied is bank2. For task3 (T3), the allocated bank counter value (BC) is three and the dominant bank (DB) is three and hence (as the bank difference is zero) r0 is not rotated (i.e. it is in bank0) which means that the bank that expected to be most frequently accessed, after all offsets have been applied is bank3. For task4 (T4), which uses eight registers, the allocated bank counter value (BC) is zero (e.g. where, because there are four memory banks, the previous bank counter value of three has been incremented by one using modulo 4 arithmetic) and the dominant bank (DB) is three (e.g. because the most frequently referenced register has been determined to be R7, which is in bank3) and hence r0 and r4 are rotated by 1 (i.e. to bank1) since −3 mod 4=1, which means that the bank that expected to be most frequently accessed, after all offsets have been applied is bank0.

By changing the way that registers are mapped to banks so that the mapping is not the same for all tasks and the banks that are expected to be most frequently accessed, after all offsets have been applied, are spaced apart, the distribution of memory accesses is more evenly spread across the different banks within a logical memory and this reduces the probability of clashes and hence the performance impact of clashes is also reduced.

As noted above, the different operations within FIG. 5 may be performed by different parts of the processing system 200 shown in FIG. 2. As described above, the task is created (in block 102) by a task creation module 206 and the task creation module 206 additionally identifies the dominant bank based on meta data provided by the compiler (in block 503), allocates the bank counter value to the task (in block 304) and updates the bank counter 216 (in block 306). The mapping of registers to banks 205 is performed by the address generation unit 212 (in block 508); however, as described above the address generation unit 212 may use the bank difference itself as part of the mapping (with the bank difference being communicated by the task creation module 206 to the address generation unit 212) or the address generation unit 212 may receive an updated base pointer for the task from the task creation module 206, where the updated base pointer has been calculated based on the bank difference.

In a variation on the method of FIG. 5, a dominant bank mask may be maintained by the task creation module 206 and the bank counter may only be incremented (in block 306) in the event that there is a clash of the dominant bank of a newly created task with banks that expected to be most frequently accessed, after all offsets have been applied, for earlier tasks, as determined using the dominant bank mask. This can be described with reference to FIGS. 7 and 8.

Figure 7:
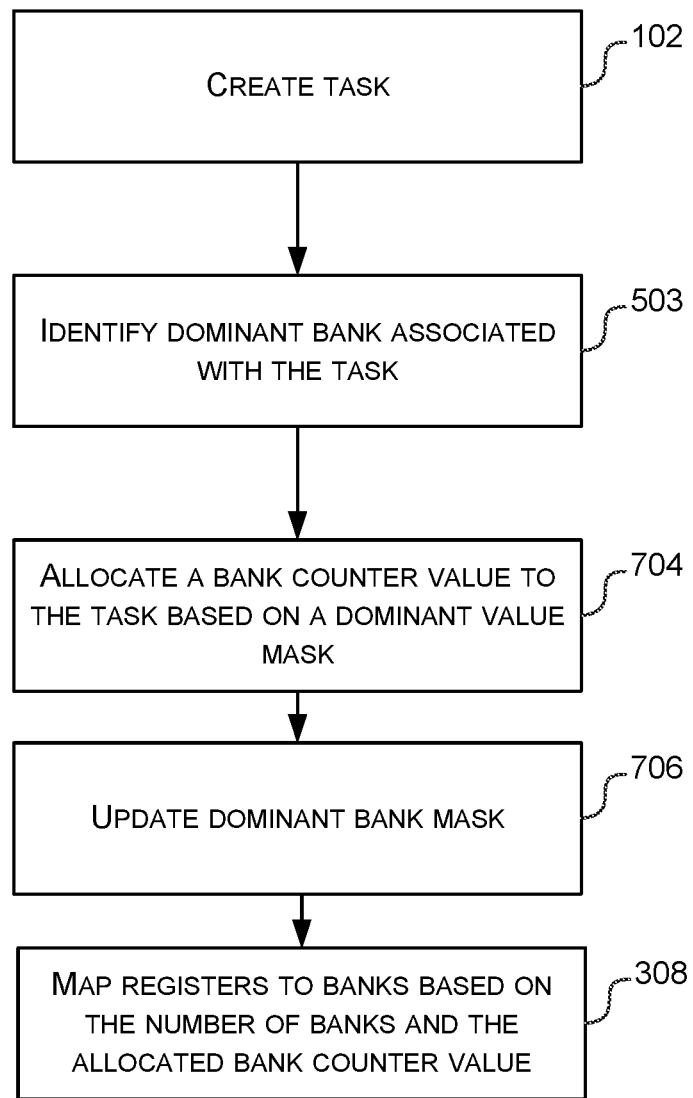
FIG. 7 is a flow diagram of a fourth example method of memory allocation.

As shown in FIG. 7, when creating a task (block 102) or at a separate time, meta data for the task is received and this meta data is used to identify the dominant bank for the task (block 503). As in the method of FIG. 5, a bank counter value is allocated to the task (block 704); however, this bank counter value that is allocated is determined based on a dominant bank mask rather than the current value of a counter (as is the case in the method of FIG. 5). The dominant bank mask may comprise one bit per bank and all bits may initially be set to a default value (e.g. zero) to indicate that no dominant bank of a task has yet been allocated to that bank and then may be set to another value (e.g. one) once a dominant bank of a task has been allocated to that bank. As there will often be more tasks than banks, once all the bits in the dominant bank mask are set to the second value (e.g. one), the entire mask may be reset (e.g. to zero) and the method may then continue. To determine the bank counter value (in block 704), the dominant bank of the task is compared to the dominant bank mask. If the dominant bank of the task clashes with a bank that expected to be most frequently accessed by an earlier task, after all offsets have been applied, which may be the dominant bank of an earlier task or an offset dominant bank, (e.g. as determined by whether the bank that corresponds to the dominant bank of the newly created task already has its bit set to indicate a prior allocation in the dominant bank mask), then the bank counter value is set to a value that offsets the dominant bank of the task so that the clash is avoided and the dominant bank mask is updated (block 706) to reflect the offset dominant bank allocation. If, however, the dominant bank does not clash with a bank that expected to be most frequently accessed by an earlier task, after all offsets have been applied, (e.g. as determined by whether the bank that corresponds to the dominant bank of the newly created task already has its bit set to indicate a prior allocation in the dominant bank mask), then the bank counter value is set to zero and the dominant bank mask is updated (block 706) to reflect the new (non-offset) dominant bank allocation. This is shown in the example of FIG. 8 in which there is no clash between task 1 (DB=0) and task 2 (DB=3), as indicated by the dominant bank mask 1000, and hence the bank counter value for those tasks is set to zero (BC=0) and the dominant bank mask is updated to 1001. However there is a clash between the dominant bank of task 3, bank zero (DB=0) 216 and the previously allocated dominant banks, as indicated by the dominant bank mask 1001, and hence the bank counter value is set to a non-zero value (e.g. one) in order to shift the bank that expected to be most frequently accessed by the task after all offsets have been applied (e.g. from bank0 to bank1) and avoid the clash. The dominant bank mask is then updated to reflect the new allocation, e.g. from 1001 to 1101.

Having allocated the bank counter value (in block 704), this is then used to map registers to banks based on the number of banks in the logical memory and the allocated bank counter value (block 308). In various examples, the mapping (in block 308) may use the same equations as the second method (described above), i.e.:

(bank number)=((register number)+(allocated bank counter value))mod(number of banks)  (equation 2)

or (memory address)=(base pointer for task)+(register offset)+(bank offset)  (equation 3)

or (memory address)=(updated base pointer for task)+ (register offset)  (equation 4)

As noted above, the different operations within FIG. 7 may be performed by different parts of the processing system 200 shown in FIG. 2. As described above, the task is created (in block 102) by a task creation module 206 and the task creation module 206 additionally maintains the dominant bank mask (as used and updated in block 704) allocates the bank counter value to the task (in block 304) and updates the bank counter 216 (in block 306). The mapping of registers to banks 205 is performed by the address generation unit 212 (in block 308); however, as described above the address generation unit 212 may use the allocated bank counter value itself as part of the mapping (with the bank counter value being communicated by the task creation module 206 to the address generation unit 212) or the address generation unit 212 may receive an updated base pointer for the task from the task creation module 206, where the updated base pointer has been calculated based on the allocated bank counter value.

As detailed above, the method of FIG. 1 may be used independently of, or in combination with the method of FIG. 3, 5 or 7. Whilst all methods are described with reference to the processing system 200 of FIG. 2, it will be appreciated that dependent upon the method used, either or both of the group counter 214 and the bank counter 216 may be omitted, i.e. the group counter 214 is used by the method of FIG. 1 and the bank counter is used by the methods of FIGS. 3, 5 and 7. It will also be appreciated that the methods of FIGS. 3, 5 and 7 require only a single memory 204 that comprises multiple banks 205 (although there may be multiple memories 204 within the system 200) and the method of FIG. 1 requires multiple logically separate memories 204 which may, or may not, comprise multiple banks 205.

Figure 9:
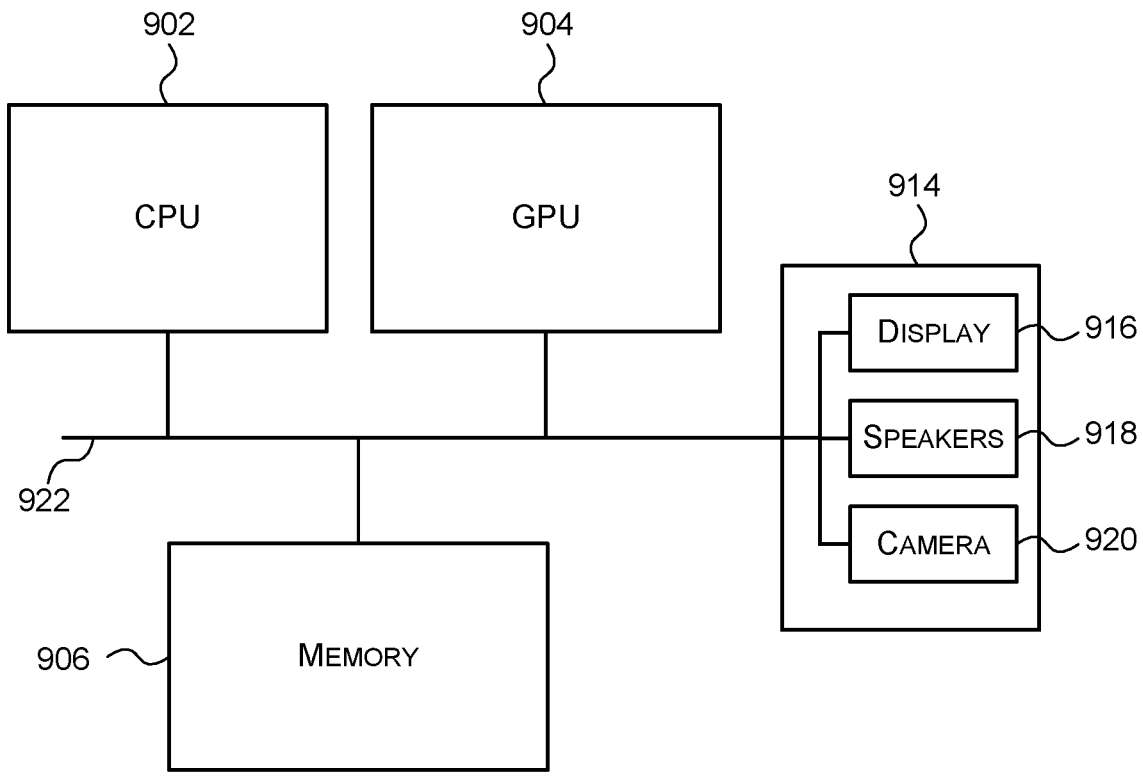
FIG. 9 shows a computer system in which the methods described herein may be implemented.

FIG. 9 shows a computer system in which the graphics processing systems described herein may be implemented. The computer system comprises a CPU 902, a GPU 904, a memory 906 and other devices 914, such as a display 916, speakers 918 and a camera 920. The CPU 902 and/or GPU 904 may operate as processing system 202 as shown in FIG. 2 and described above and the memory 906 may comprise a plurality of logical memories 204 and/or a plurality of memory banks 205. The components of the computer system can communicate with each other via a communications bus 922.

The systems of FIGS. 2 and 9 are shown as comprising a number of functional blocks. This is schematic only and is not intended to define a strict division between different logic elements of such entities. Each functional block may be provided in any suitable manner. It is to be understood that intermediate values described herein as being formed by a processing system need not be physically generated by the processing system at any point and may merely represent logical values which conveniently describe the processing performed by the processing system between its input and output.

The processing systems described herein may be embodied in hardware on an integrated circuit. The processing systems described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java™ or OpenCL™. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), physics processing units (PPUs), radio processing units (RPUs), digital signal processors (DSPs), general purpose processors (e.g. a general purpose GPU), microprocessors, any processing unit which is designed to accelerate tasks outside of a CPU, etc. A computer or computer system may comprise one or more processors. Those skilled in the art will realize that such processing capabilities are incorporated into many different devices and therefore the term 'computer' includes set top boxes, media players, digital radios, PCs, servers, mobile telephones, personal digital assistants and many other devices.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a processor configured to perform any of the methods described herein, or to manufacture a processing system comprising any apparatus described herein. An integrated circuit definition dataset may be, for example, an integrated circuit description.

Therefore, there may be provided a method of manufacturing, at an integrated circuit manufacturing system, a processor as described herein. Furthermore, there may be provided an integrated circuit definition dataset that, when processed in an integrated circuit manufacturing system, causes the method of manufacturing a processor to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog® or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a processor will now be described with respect to FIG. 10.

Figure 10:
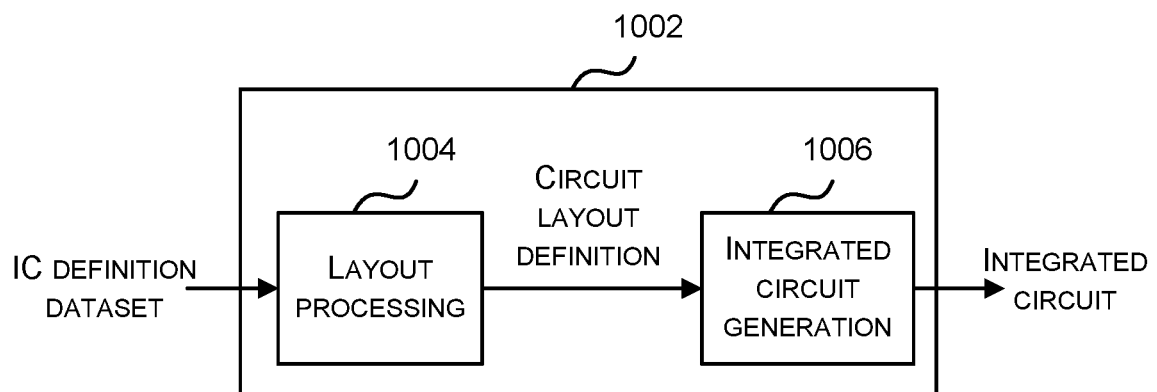
FIG. 10 shows an integrated circuit manufacturing system for generating an integrated circuit embodying a processing system as described herein.

FIG. 10 shows an example of an integrated circuit (IC) manufacturing system 1002 which is configured to manufacture a processor as described in any of the examples herein. In particular, the IC manufacturing system 1002 comprises a layout processing system 1004 and an integrated circuit generation system 1006. The IC manufacturing system 1002 is configured to receive an IC definition dataset (e.g. defining a processor as described in any of the examples herein), process the IC definition dataset, and generate an IC according to the IC definition dataset (e.g. which embodies a processor as described in any of the examples herein). The processing of the IC definition dataset configures the IC manufacturing system 1002 to manufacture an integrated circuit embodying a processor as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a processor without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 10 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 10, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget."

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of memory allocation in a processing system, the processing system comprising a memory comprising b memory banks, wherein b is an integer, and the method comprising:
    allocating a bank counter value to a task; and
    mapping registers referenced by the task to memory banks in the memory, wherein the mapping is based on b and the allocated bank counter value.

2. The method according to claim 1, wherein the bank counter value is allocated to a task when the task is created.

3. The method according to claim 1, wherein allocating a bank counter value to the task comprises allocating a current value of the bank counter to the task and the method further comprises:
    adjusting the bank counter value for allocation to a next task.

4. The method according to claim 3, wherein the value of the bank counter is adjusted by incrementing the bank counter.

5. The method according to claim 4, wherein the bank counter is incremented by a fixed or a variable amount between 0 and b−1.

6. The method according to claim 1, wherein the method further comprises:
    identifying a dominant bank associated with the task, and wherein allocating a bank counter value to the task comprises:
        allocating a bank counter value to the task based on the dominant bank for the task and a stored dominant bank mask; and
        updating the dominant bank mask based on the allocation.

7. The method according to claim 6, wherein the dominant bank is identified based on meta data associated with the task.

8. The method according to claim 6, wherein the dominant bank mask comprises b bits, one bit corresponding to each of the b memory banks and updating the dominant bank mask based on the allocation comprises:
    in response to allocating a dominant bank of a task to one of the memory banks, updating a bit in the dominant bank mask corresponding to said one of the memory banks from a first value to a second value.

9. The method according to claim 8, wherein updating the dominant bank mask based on the allocation further comprises:
    in response to determining that all b bits in the dominant bank mask are set to the second value, resetting all the bits in the dominant bank mask to the first value.

10. The method according to claim 1, wherein mapping registers referenced by the task to memory banks in the memory comprises:
    mapping registers referenced by the task to memory banks in the memory according to:

(bank number)=((register number)+(allocated bank counter value))mod b, where bank number is an identifier for a memory bank and register number is an identifier for a register.

11. The method according to claim 1, wherein mapping registers referenced by the task to memory banks in the memory comprises:
    calculating a memory address for a register based on a base pointer for the task, a register offset determined from the register number and a bank offset determined from the allocated bank counter value.

12. The method according to claim 1, wherein mapping registers referenced by the task to memory banks in the memory comprises:
    updating a base pointer for the task based on the allocated bank counter value; and
    calculating a memory address for a register based on the updated base pointer for the task and a register offset determined from the register number.

13. The method according to claim 1, wherein allocating a bank counter value to the task comprises allocating a current value of the bank counter to the task and the method further comprises:
    identifying a dominant bank associated with the task; and
    adjusting the bank counter value for allocation to a next task, and wherein mapping registers referenced by the task to memory banks in the memory comprises:
    mapping registers referenced by the task to memory banks in the memory based on b, the allocated bank counter value and the dominant bank for the task.

14. The method according to claim 13, wherein adjusting the bank counter value comprises incrementing the bank counter value.

15. The method according to claim 13, wherein mapping registers referenced by the task to memory banks in the memory based on b, the allocated bank counter value and the dominant bank for the task comprises:
    mapping registers referenced by the task to memory banks in the memory based on b, the allocated bank counter value and the dominant bank for the task according to:

(bank number)=((register number)+(bank difference)) mod $b$, and (bank difference)=(allocated bank counter value)−(dominant bank number)

where bank number is an identifier for a memory bank, dominant bank number is an identifier for the dominant bank of the task and register number is an identifier for a register.

16. The method according to claim 13, wherein mapping registers referenced by the task to memory banks in the memory based on b, the allocated bank counter value and the dominant bank for the task comprises:

calculating a memory address for a register based on a base pointer for the task, a register offset determined from the register number and a bank difference offset determined from the allocated bank counter value and the dominant bank of the task.

17. The method according to claim 13, wherein mapping registers referenced by the task to memory banks in the memory based on b, the allocated bank counter value and the dominant bank for the task comprises:

updating a base pointer for the task based on the allocated bank counter value and the dominant bank for the task; and calculating a memory address for a register based on the updated base pointer for the task and a register offset determined from the register number.

18. The method according to claim 13 or 14, wherein the dominant bank is identified based on meta data associated with the task.

19. A processing system comprising:

a memory comprising b memory banks, wherein b is an integer;

a bank counter;

a task creation module configured to allocate a bank counter value to a task; and an address generation unit configured to map registers referenced by the task to memory banks in the memory, wherein the mapping is based on b and the allocated bank counter value.

20. The processing system according to claim 19, wherein the processing system comprises a single logical memory comprising b memory banks.

* * * * *